Aug. 23, 1966   L. MARCOUX   3,267,953
VALVE ASSEMBLY
Filed May 7, 1963
2 Sheets-Sheet 1
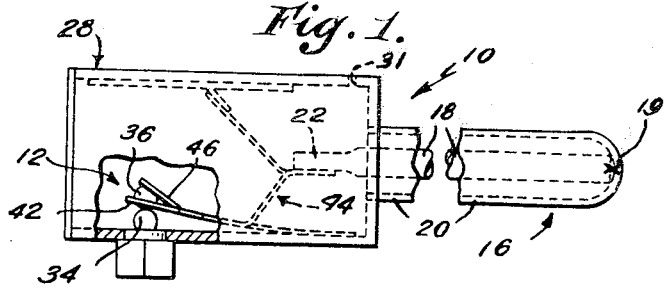
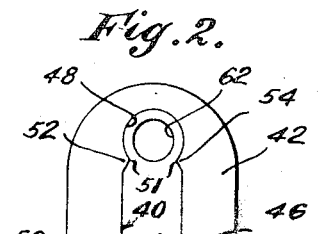
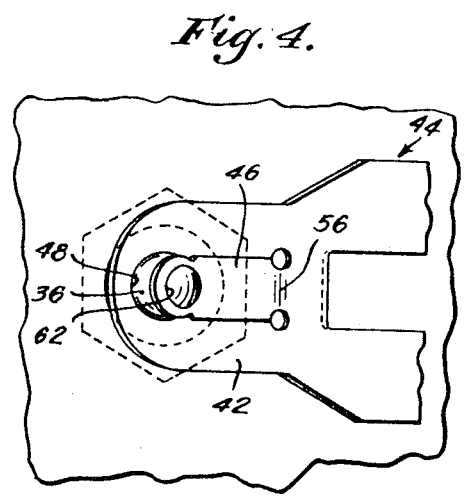
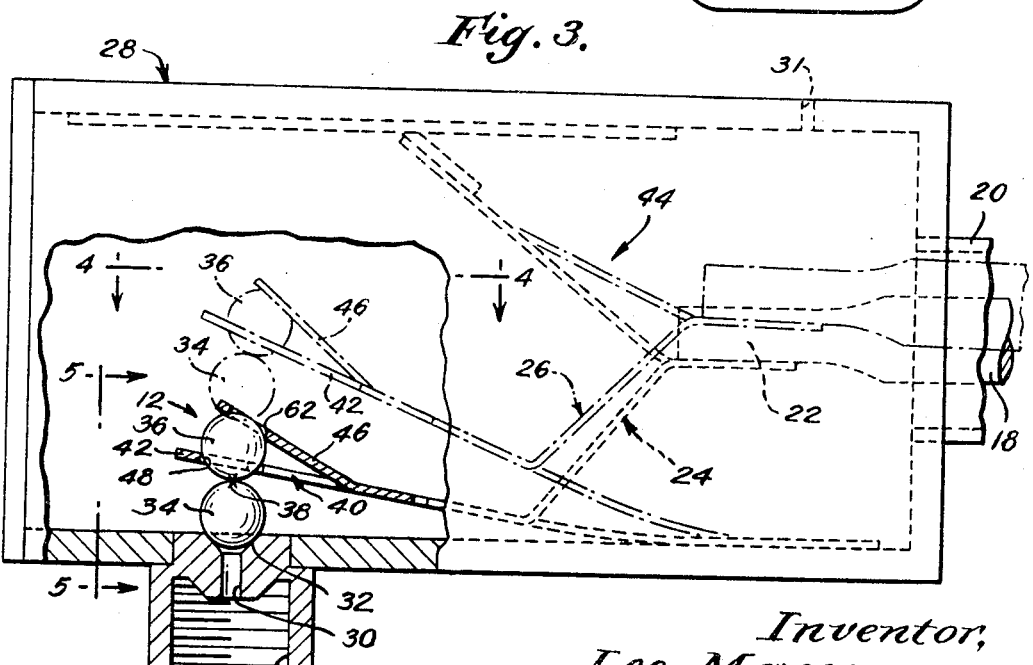
Inventor,
Leo Marcoux,
by Townsend McGunn
Atty.
Witness: Edward J. Connors, Jr.

Aug. 23, 1966   L. MARCOUX   3,267,953
VALVE ASSEMBLY
Filed May 7, 1963   2 Sheets-Sheet 2
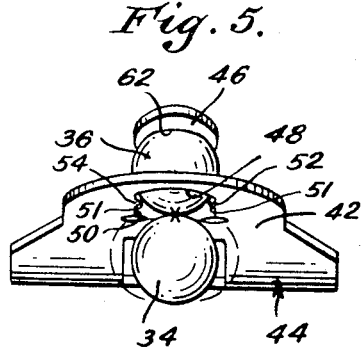
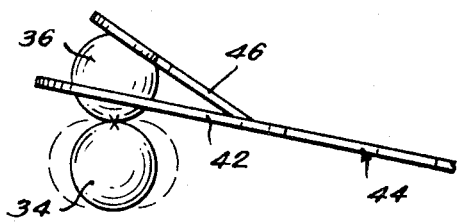
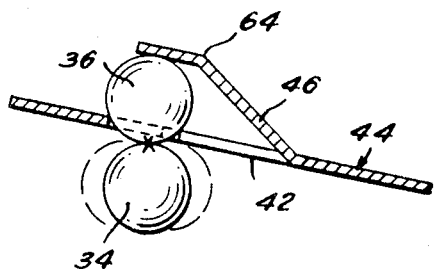
Inventor,
Leo Marcoux,
Witness: Edward J. Connors Jr.   by Townsend M. Gunn
Att'y.

United States Patent Office 3,267,953
Patented August 23, 1966

3,267,953
VALVE ASSEMBLY
Leo Marcoux, Pawtucket, R.I., assignor to Texas Instruments Incorporated, Dallas, Tex., a corporation of Delaware
Filed May 7, 1963, Ser. No. 278,640
12 Claims. (Cl. 137—329.04)

This invention relates to a new and improved valve assembly which is particularly adapted for, although not limited to, use in a thermally responsive control device.

Among the several objects of the invention is the provision of a new and improved valve assembly which is compact, simple in design, and which is easily manufactured and assembled into final operative condition.

Another object of the invention is the provision of a valve assembly requiring a minimum number of parts in its construction.

A further object of the invention is the provision of a valve assembly which is substantially unaffected by overriding or underriding movement.

It is a further object of the invention to provide an improved valve assembly which is capable of self-alignment whereby its operation is substantially unaffected by variations in the construction and assembly tolerances of its own component parts or the component parts of the device used to actuate the valve assembly.

Other objects will be in part apparent and in part pointed out hereinafter.

The invention accordingly comprises the elements and combinations of elements, features of construction and arrangements of parts which will be exemplified in the structures hereinafter described and the scope of the application of which will be indicated in the following claims.

In the accompanying drawings in which one of the various possible embodiments of the invention is illustrated:

FIG. 1 is a fragmentary side elevation of an exemplary thermostatic control device with a portion thereof broken away to show in solid lines a valve assembly embodying the instant invention;

FIG. 2 is a plan view of a blank employed in forming a portion of the device shown in FIG. 1;

FIG. 3 is an enlarged fragmentary view similar to FIG. 1 showing the device in various stages of its operation, and showing portions of the valve assembly in section;

FIG. 4 is a fragmentary view taken on line 4—4 of FIG. 3;

FIG. 5 is a view taken on line 5—5 of FIG. 3 showing a portion of the valve assembly embodying the invention;

FIG. 6 is a side elevation of a portion of the valve assembly shown in FIG. 5; and FIG. 7 is a view similar to FIG. 6 and partly in section showing a second embodiment of the valve assembly of this invention.

Similar reference characters indicate corresponding parts throughout the several views of the drawings.

Dimensions of certain of the parts as shown in the drawings may have been modified and/or exaggerated for the purpose of clarity of illustration.

It is to be understood that the invention is not limited in its application to the details of construction and arrangement of parts illustrated in the accompanying drawings since the invention is capable of other embodiments and of being practiced or carried out in various ways. Also, it is to be understood that the phraseology or terminology employed herein is for the purpose of description and not of limitation.

Referring now to the drawings, there is shown in FIG. 1 an exemplary thermally responsive valve, generally indicated by reference numeral 10, which incorporates a valve assembly embodying the instant invention and generally indicated by reference numeral 12. Valve assembly 12 includes a valve mounting and actuating member 42 formed of a suitably flexible material such as, for example, Haynes 25 alloy, an alloy consisting essentially by weight of 19% to 21% chromium, 14% to 16% tungsten, 9% to 11% nickel, 0.15% max. carbon, 2.0% max. iron and the balance cobalt. Member 42 may be secured to or formed integrally with one end of a condition responsive motion transmitting member, generally designated by reference numeral 44.

Valve assembly 12 is mounted in a housing 28 having an inlet port 30 and an outlet port 31, each of which communicates with the exterior of housing 28. Port 30 includes a valve seat 32 for receiving and seating a valve member 34, and a threaded portion 33 for connection to a source of fluid pressure. Valve member 34, which may take the form of a spherical ball for example, is rigidly and tangentially connected to a second spherical ball-like member 36 at a region 38 on the peripheries of the members 34 and 36 as, for example, by welding. In one preferred form of the invention, members 34 and 36 are spherical balls of substantially identical size such that either may be used interchangeably as the valve member. Members 34 and 36 may be formed of a suitably hard, gouge resistant material such as, for example, stainless steel or the alloy sold under the trademark Cobenium, an alloy consisting essentially of 40% cobalt, 20% chromium, 15% nickel, 7% molybdenum, 2% manganese, 0.04% beryllium, 0.05% carbon and the balance iron.

Member 36 is mounted for universal pivotal movement in an aperture or seat 48 forming a portion of a slot or aperture 40 having a generally keyhole-shaped configuration provided in member 42. As best seen in FIG. 5, the keyhole-shaped slot 40 provided by member 42 has three portions therein. A first valve seating portion 48 is curvilinear in shape and preferably of a generally circular configuration having a diameter less than the diameter of member 36 to thereby provide a retaining seat for member 36. A second portion 50 of aperture 40 takes the form of an elongated access slot having a length and width which exceeds the diameter of member 36 and also, preferably, member 34 or a length and width sufficiently large to permit convenient entry of member 36 therethrough. Slot portion 50 communicates with seat portion 48 through a third portion 51 lying between the necked-down sides of slot 40 formed by restraining projections 52 and 54. Projections 52 and 54 are separated by a distance less than the diameter of circular seat 48, as best seen in FIG. 2, spaced projections 52 and 54 may form a portion of the curvilinear seat 48.

Member 36 is engaged by one end of a resilient spring finger or flexible tab 46 whose other end is secured to or formed integrally with member 42 to resiliently bias tab 46 against member 36 to urge the latter toward seating engagement with seat 48. As best seen in FIGS. 1 and 3 to 6, tab 46 has an aperture 62 in its end adjacent spherical member 36 for receiving and engaging a portion of spherical member 36. As shown in the embodiment of FIG. 7, aperture 62 may be omitted and tab 46 may have its end bent into engagement with member 36 as at 64. Alternatively, both the aperture and the bent portion of tab 46 may be omitted provided that flexible tab 46 engages member 36 to bias the latter toward engagement with seat 48. The restraining position of projections 52 and 54 combined with the resilient biasing action of the flexible tab 46 serves to retain spherical member 36 in seat 48. However, spherical member 36 is free to move in universal pivotal movement in seat 48 to provide spherical valve member 34 with universal movement between the dotted line positions shown in FIGS. 5 and 6. This universal movement provides the valve assembly with a self-aligning feature whereby valve member 34 aligns itself for proper seating in seat 32. This feature, as well as the flexible construction of mounting member 42 (and member 44), enables the valve assembly to take up overriding or underriding motion to insure accurate valve seating and also permits accurate valve seating while permitting relatively wide manufacturing and assembly tolerances.

In FIG. 2 there is shown a plan view of a blank from which, by way of example, both the motion transmitting member 44 and the valve mounting member 42 (with slot 40 and tab 46) may be formed. Formation of the motion transmitting member 44 is accomplished by bending at the locations of the broken lines 58 and 60 to provide the formed configuration shown in FIGS. 1 and 3, as is more fully described in the copending application, entitled "Motion Amplification Means," Serial No. 114,733, filed June 5, 1961, in the name of Henry J. McCarrick and assigned to the assignee of the instant application. Keyhole-shaped slot 40 is formed by relieving tab 46 which is struck from member 42 and by bending tab 46 out of the plane of member 42 along dotted line 56 as shown in FIG. 2 to provide the formed configuration shown in FIGS. 1 and 3 to 6. Similarly, seat or aperture 62 may be formed by striking out a portion of member 46.

Assembly of the valve structure is accomplished by inserting spherical member 36, after valve member 34 has been attached thereto, through elongated slot portion 50 of slot 40 (beneath the right hand portion of tab member 46 as seen in FIG. 3), against the biasing action of tab member 46 until the narrow neck or interconnection 38 between members 36 and 34 is approximately in the slot. Member 36 (and valve member 34) is then brought toward projections 52, 54, in third portion 51, while maintaining pressure against tab 46, and is forced over restraining projections 52, 54, toward circular seat portion 48 in slot 40 until it snaps into position in seat 48. Spherical member 36 is thereafter maintained in seat 48 by restraining projections 52, 54, and the biasing force of tab member 46.

The operation of the device is as follows: When condition responsive motion transmitting member 44 moves from the position indicated at 24 shown in FIG. 3, to the position indicated at 26, valve assembly 12 moves from the solid line closed valve position shown in FIG. 3 to the broken line open valve position. Conversely, when motion transmitting member 44 moves from position 26 to position 24, valve assembly 12 moves from the open valve position to the closed valve position shown in FIG. 3.

It can be seen that as valve assembly 12 moves in a valve closing direction toward the solid line position shown in FIG. 3, accurate seating of valve 34 in conical valve seat 32 is insured by the self-aligning feature of the device. Since valve member 34 is rigidly interconnected with spherical member 36 which is pivotably mounted in aperture 40, it is thereby capable of universal movement between the dotted line positions shown in FIGS. 5 and 6. Thus valve member 34 will align itself with valve seat 32 under the camming action of the contiguous surfaces of valve seat 32. This insures proper seating of valve member 34 without the necessity of maintaining exact tolerances in the manufacture and assembly of the device.

As best seen in FIG. 1, valve assembly 12 may, for example, be employed in a thermally responsive control device generally indicated by the reference numeral 10 of the type described more fully in the above mentioned copending application, Serial No. 114,733. Control device 10 includes a thermally responsive differential actuator generally designated by reference numeral 16 and a motion transmitting or amplifying member 44 mounted for movement in response to actuator 16. Thermally responsive actuator 16 includes a rod 18 having a relatively low coefficient of thermal expansion, such as, for example, Invar, rigidly secured to the closed end portion 19 of tube 20 having a relatively high coefficient of thermal expansion such as, for example, brass. The open end of tube 20 is rigidly mounted on housing 28 such that when rod 18 and tube 20 are subjected to increased temperature conditions, the differential expansion of the rod and tube will result in movement of end 22 of rod 18 in a direction upwardly and to the right, as shown in FIG. 3. Rod end 22 is attached to a portion of motion amplifying member 44 such that the movement of rod end 22 results in movement of motion amplifying member 44 from position 24 in which valve assembly 12 is in the closed position as shown in the solid line portion of FIG. 3, to position 26 in which valve assembly 12 is in the open valve broken line position shown in FIG. 3. Conversely, when a decrease in temperature conditions surrounding thermally responsive actuating member 16 occurs, motion amplifying member 44 moves from position 26 to position 24 to close the valve.

It will be seen from the foregoing that the invention provides a valve assembly having a number of advantages including the advantage of being relatively insensitive to the effects of overriding and underriding movement due to the flexibility of the valve mounting members and the universal pivotal mounting of the valve member 34. In addition, a self-aligning feature is realized by the universal mounting of valve member 34 and a construction is allowed which is simple to manufacture, assemble and form and which requires a minimum number of component parts for the achievement of optimum results.

In view of the above, it will be seen that the several objects of the invention are achieved and other advantageous results are obtained.

As many changes could be made in the above constructions without departing from the scope of the invention, it is intended that all matter contained in the above description or shown in the accompanying drawings shall be interpreted as illustrative and not in a limiting sense, and it is also intended that the appended claims shall cover all such equivalent variations as come within the true spirit and scope of the invention.

I claim:

1. A device for the control of fluid flow comprising a housing, said housing having a port communicating with the exterior of said housing; first and second spherical members, said first member being engageable with said port for controlling fluid flow therethrough said first and second spherical members being substantially identical in size whereby they may be used interchangeably one for the other; said members being rigidly directly interconnected at contiguous tangential portions of the peripheries of each of said members; and means engaged with said second member for mounting said first member for movement relative to and for seating in a portion of said port to restrict fluid flow therethrough.

2. A device for the control of fluid flow comprising a valve port; a first spherical valve member associated with said port for controlling fluid flow therethrough; a second spherical member interconnected with said first spherical valve member adjacent their peripheries; a resilient member engaging one of said members adjacent their interconnection to mount said first spherical member for universal movement relative to said resilient member and for seating in a portion of said port to restrict fluid flow therethrough, said resilient member having an aperture therein having a first portion of substantially circular configuration for pivotally seating said second spherical member said first portion of said aperture having a diameter less than the diameter of said second spherical member, and said aperture including a second portion communicating with said first portion and having dimensions larger than the diameter of said second spherical member whereby said second spherical member may be inserted through said second portion of said aperture and seated in said first portion to provide for universal movement of said first spherical member.

3. A device for the control of fluid flow comprising a housing, said housing having a port communicating with the exterior of said housing; a first spherical member associated with said port for controlling fluid flow therethrough; a second spherical member rigidly directly interconnected with said first member at contiguous tangential portions of the peripheries of each of said members; a condition responsive, movable, resilient member having an aperture therein, a first portion of which engages a portion of said second spherical member to mount said first of said spherical members for universal movement relative to said resilient member and for movement relative to and for seating in said port in response to movement of said resilient member.

4. A device as set forth in claim 3 wherein said aperture includes a seat portion of generally circular configuration having a diameter less than the diameter of and for pivotally seating the spherical portion of said second member, said aperture also having an access portion having dimensions of suffiicent size to permit convenient passage of said second member through said second portion.

5. A device as set forth in claim 3 and wherein said aperture includes a seat portion of generally circular configuration having a diameter less than the diameter of the spherical portion of said second member for pivotally seating said second member and wherein said resilient member includes a pair of restraining projections, separated by a distance less than the diameter of said seat portion for retaining said second member in said seat portion.

6. A device as set forth in claim 4 and spring means associated with one of said valve and second members for biasing said second member toward engagement with said seat portion of said aperture.

7. A device as set forth in claim 4 wherein said resilient member includes a resilient tab portion engaging said second member to bias said second member toward engagement with said seat portion of said aperture.

8. A device as set forth in claim 7 wherein said resilient tab portion is formed integrally with said resilient member.

9. A valve mounting assembly comprising a valve member; a spherical member peripherally interconnected with said valve member; a flexible mounting member having an aperture therein; a flexible tab member formed integrally with said mounting member for exterting a biasing force on said spherical member; said aperture including a seat portion of generally circular configuration having a diameter less than the diameter of said spherical member for engaging said spherical member adjacent the interconnection of said valve member and said spherical member, said seat portion including a pair of restraining projections separated by a distance less than the diameter of said seat portion, and a slot portion communicating with said seat portion and having dimensions greater than the diameter of said spherical member whereby said spherical member may be inserted through said slot portion and seated in said seat portion of said aperture against the biasing force of said tab member and may be pivotally retained in said seating portion by said tab member and said restraining projections to mount said valve member for universal movement.

10. A valve mounting assembly comprising a spherical valve member; a second spherical member peripherally rigidly interconnected with said valve member to form a subassembly; a flexible mounting member having an aperture therein; a flexible tab member formed integrally with said mounting member for exerting a biasing force against said second spherical member; said aperture including a seat portion of generally circular configuration having a diameter less than the diameter of said second spherical member for engaging said second spherical member adjacent the interconnection of said valve member and said second spherical member; a pair of restraining projections separated by a distance less than the diameter of said seat portion, and a slot portion communicating with said seat portion and having dimensions greater than the smallest of the diameters of said valve and said second members whereby a portion of said subassembly may be inserted through said slot portion to seat said second spherical member in said seat portion of said aperture against the biasing force of said tab member and to pivotally retain said second member in said seating portion by said tab member and said restraining projections to mount said valve member for universal movement.

11. A valve mounting assembly comprising a spherical valve member; a second spherical member peripherally rigidly interconnected with said valve member to form a subassembly; a flexible mounting member having an aperture therein; a flexible tab member formed integrally with said mounting member for exerting a biasing force against said second spherical member; said aperture including a seat portion of generally circular configuration having a diameter less than the diameter of said second spherical member for engaging said second spherical member adjacent the interconnection of said valve member and said second spherical member; the dimensions of said aperture also being greater than the smallest of the diameters of said valve and said second members whereby a portion of said subassembly may be inserted through said aperture to seat said second spherical member in said seat portion of said aperture against the biasing force of said tab member and to pivotally retain said second member in said seating portion by said tab member to mount said valve member for universal movement.

12. A valve mounting assembly comprising a spherical valve member; a second spherical member peripherally rigidly interconnected with said valve member to form a subassembly; a flexible mounting member having an aperture therein; a flexible tab member formed integrally with said mounting member for exerting a biasing force against said second spherical member; said aperture including a seat portion of generally circular configuration having a diameter less than the diameter of said second spherical member for engaging said second spherical member adjacent the interconnection of said valve member and said second spherical member; a pair of restraining projections separated by a distance less than the diameter of said seat portion, the dimensions of said aperture also being greater than the smallest of the diameters of said valve and said second members whereby a portion of said subassembly may be inserted through said aperture to seat said second spherical member in said seat portion of said aperture against the biasing force of said tab member and to pivotally retain said second member in said seating portion by said tab member and said restraining projections to mount said valve member for universal movement.

References Cited by the Examiner

UNITED STATES PATENTS

| | | |
|---|---|---|
| 658,797 | 10/1900 | Moeres. |
| 1,062,138 | 5/1913 | Baylis _____ 251—88 X |
| 2,667,897 | 2/1954 | Huntington _____ 251—88 X |
| 2,720,212 | 10/1955 | Kimm et al. _____ 251—86 X |
| 3,159,181 | 12/1964 | Harke _____ 251—88 X |

M. CARY NELSON, *Primary Examiner.*

A. ROSENTHAL, *Assistant Examiner.*